United States Patent Office 3,450,505
Patented June 17, 1969

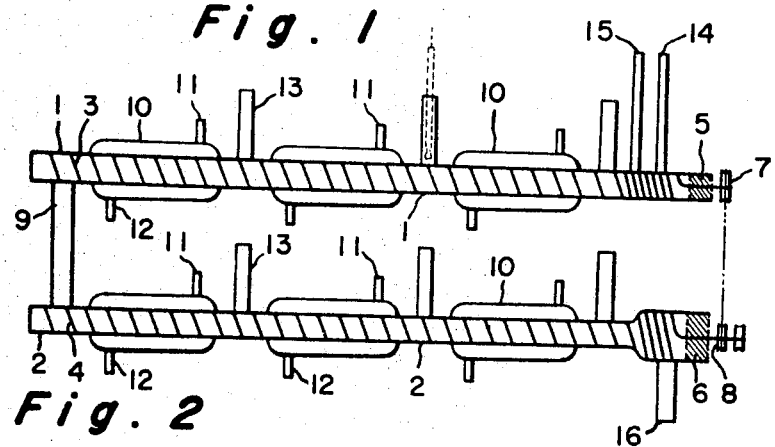
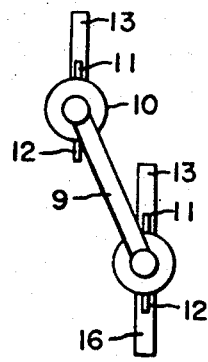
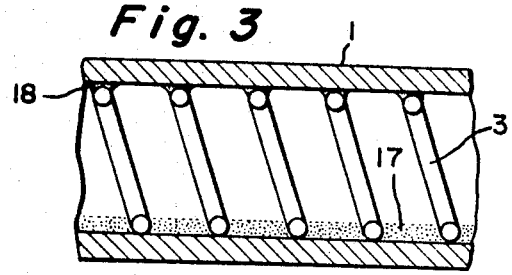
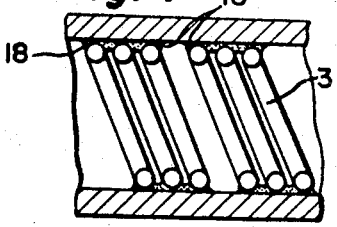
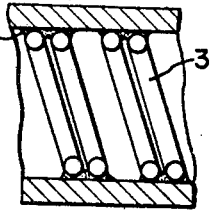

3,450,505
REACTOR OF THE TUBULAR TYPE
Hozumi Tanaka, Ashiya-shi, Minoru Hanabusa, Takarazuka-shi, Kazuaki Goshima, Hiraoka-shi, and Yutaka Unno and Sadaji Kajihara, Osaka-shi, Japan, assignors to Shionogi & Co., Ltd., Osaka-shi, Japan
Filed Apr. 5, 1966, Ser. No. 540,233
Claims priority, application Japan, Apr. 17, 1965, 40/22,820
Int. Cl. B01t 1/00
U.S. Cl. 23—285  5 Claims

ABSTRACT OF THE DISCLOSURE

A tubular reactor to transport along a longitudinal path for processing separately introduced reaction material and reagent. The reaction material and the reagent form a film on the exterior wall surface of the reactor. The propelling force consists of a rotatable wire in spiral form or series of spiraling wires. Exhaust pipes are provided for gases resulting from processing between jackets wherein the jackets themselves have inlet and outlet ports for circulation of a cooling medium.

---

This invention relates to a reactor of the tubular type for effecting a continuous reaction.

Reactors for effecting a continuous reaction using long tubes have been known. Conventional reactors of the tubular type for effecting a continuous reaction generally have rotary blades arranged in the form of screws fitted in a tube or rotary blades mounted on a shaft at regular intervals through a tube. A reaction material fed through from one end of the tube to fill the tube can be transferred to the other end of the tube by the rotating blades while undergoing reaction on the way. When a reactor of this type is used, it is difficult to give vent to gases which might be generated as a result of the production, all at once, of a great deal of thermal energy caused by a reaction taking place in a shorter time than usual. If this state occurs, pressure in the tube will rise rapidly, making it impossible to continue the supply of a reaction material to carry on the reaction or causing reaction material that has undergone reaction to gush out of the inlet port or the outlet port. This results in a dangerous situation for both personnel and equipment and the operation can be continued no longer. The tube of a conventional reactor for effecting a continuous reaction is generally filled with a reaction material or the major portion of the tube is occupied by a reaction material. Therefore, substantially large quantities of the reaction material take part in the reaction, since the area of the inner wall of tube is relatively small with respect to the amount of reaction material taking part in the reaction. If the reaction material is to undergo an exothermic reaction, it will take an undesirably long time to transfer heat through the tube wall, thereby causing partial overheating to develop in the reaction materials undergoing reaction, resulting in the development of undesirable side-reactions.

Assuming that a reaction is to take place in a reactor of the so-called batch type, which has been in use for many years, a reagent will be added dropwise or in a stream to a reaction material that has been fed to the reactor, and a reaction will occur while the mixture is being stirred. After a certain quantity of reagent has been added and the reaction has been under way for some time, the reagent added fresh to the mixture will react with that portion of reaction material in the mixture that has not reacted with the reagent. It is most likely that it will take a certain period of time for all the reaction material in the mixture to conclude the reaction. Undesirable side-reactions might occur in the process.

The inventor has carried out much research on reactors with a view to obviating the disadvantages of conventional reactors for effecting a continuous reaction and of conventional reactors of the batch type. The research has borne fruit in the reactor of the present invention which obviates all the disadvantages, such as the rise of pressure in the reaction tube, which are inherent in conventional reactors for effecting a continuous reaction and conventional reactors of the batch type as the invention provides a reactor with means to give vent to large quantities of gases through the hollow portion in the reaction tube, which may be generated as a result of the reaction occurring between a reaction material and a reagent fed continuously to the reactor in adequately small quantities. According to the invention, a plurality of reaction material inlet ports are formed at the starting end of the reaction tube system arranged horizontally and exhaust pipes are mounted at suitable positions on said tube system which constitutes a reactor for effecting a continuous reaction. Said reactor comprises a system of reaction tubes provided with wire members wound spirally and fitted in said tubes for rotational movement in such a manner that the outer circumferential surfaces of said spiral members are almost in contact with the inner wall surfaces of the reaction tubes. The reactor includes a plurality of heating and/or cooling jackets mounted on the reaction tubes, to maintain proper reaction temperatures. The reaction materials and reagent are fed through from said inlet ports into the tube system to undergo reaction and the reaction material is transferred from one end of said tube system to the other end thereof in the form of a thin film or a thin layer of solution spread on the inner wall surface of the reaction tubes.

Other advantages and objects of the invention will become apparent after the description hereafter set forth is considered in conjunction with the drawings annexed hereto wherein:

FIG. 1 is a front sectional view of an embodiment of this invention;

FIG. 2 is a side view of FIG. 1;

FIG. 3 is a fragmentary sectional view on an enlarged scale of a portion of the tube shown in FIG. 1;

FIG. 4 is a modification of the spiral wires of FIG. 3; and

FIG. 5 is a further modification of the spiral wires of FIG. 3.

The construction and operation of the invention will now be explained in some detail with reference to an embodiment. In FIG. 1, the reaction tubes 1 and 2 are arranged substantially horizontally and in parallel relationship with each other. Spiral wire members 3 and 4 are mounted in the reaction tubes 1 and 2, respectively, in such a manner that the outer circumferential surfaces thereof are almost in contact with the inner wall surfaces of the tubes. The spiral wire members 3 and 4 extend out of one end of each of the tubes through stuffing boxes 5 and 6 and are connected to pulleys 7 and 8, respectively, so that said spiral wire members may be rotated in relation to the tube by power supplied from a power source (not shown). The reaction tubes 1 and 2 are closed at their other ends but communicate with each other by a connecting pipe 9. A plurality of axially spaced outside jackets 10 are fitted in circumscribing relation over sections of the reaction tubes 1 and 2. Each of the outside jackets 10 are provided with an inlet port 11 and an outlet port 12 for a heating or cooling medium to pass therethrough. A plurality of exhaust pipes 13 are mounted on and in communication with the reaction tubes 1 and 2 between the outside jackets 10 so that gases generated when a reaction occurs may be released from the reaction tubes. The exhaust pipes 13 also serve as pipes for inserting thermometers for measuring reaction temperatures. An inlet port 14 through which a reaction material is fed and an inlet port 15 through which a reagent is fed are formed at the right end of tube 1, as seen in FIG. 1. An outlet port 16, through which a reaction solution that has undergone reaction is discharged, is formed at the right end of tube 2, as seen in FIG. 1.

In operation, pulleys 7 and 8 are rotated by power supplied from outside to rotate the spiral wire member 3 in tube 1 in a counter-clockwise direction and the spiral wire member 4 in tube 2 in the clockwise direction. A reaction material is fed through inlet port 14 and a reagent is fed through inlet port 15 into tube 1 continuously. The optimum ratio of reagent to reaction material should of course be determined before feeding them to the reactor system. These two materials will be spread, upon being fed into the pipe, on the inner wall surface of the tube by the spiral wire member rotating below the inlet ports, and the reaction material in the form of a thin film or a thin layer will undergo reaction while being propelled forwardly by the spiral wire member rotating in the counter-clockwise direction.

To explain this operation more in detail, when the quantities of reaction material fed to tube 1 are not so great, the reaction material spread evenly on the inner wall surface of tube 1 in the form of a thin film (as shown in FIG. 3) is propelled forwardly by the spiral wire member together with the reaction solution 18 which has become deposited in the space between the spiral wire member and the inner wall surface of tube, and a reaction takes place while the reaction material is being propelled forwardly. When substantially large quantities of reaction material are fed to the pipe, a spiral member consisting of multiple spiral wires, such as double spiral wires or triple spiral wires as shown in FIGS. 4 and 5, is used. The use of multiple spiral wires makes it possible to propel large quantities of reaction material forwardly while the wires are rotating. This is because the reaction material 18 deposited in the space between the wires and the inner tube surface is larger in quantity when multiple spiral wires are used than when a single spiral wire is used. The precise optimum number of spiral wires should vary depending on the rate of reaction, heat exchange efficiency of outside jacket 10, the number of rotation of spiral wire member per unit hour, the inner diameter of pipe, and other factors.

From the foregoing description, it will be understood that the reaction material undergoes reaction while being propelled forwardly. The material is spread in the form of a thin film on the inner wall surface of tube 1 and is deposited in the pocket defined between the leading edge of the coils and the side wall of the tube and carried forward in these pockets as the spiral wire member 3 rotates in the counter-clockwise direction. It is advanced to the left end of the tube, as seen in FIG. 1. Upon reaching the left end of the tube, the reaction material moves downwardly through the communicating pipe 9 into reaction tube 2, where it is propelled forwardly by the spiral wire member 4 rotating in the clockwise direction to be finally discharged through the discharge port 16.

Gases generated in the reaction tubes while the reaction is under way will make their way through the center hollow portion of reaction tubes into the exhaust pipes 13 to be vented out of the system. The hazards of pressure in the reaction tubes rising to a dangerously high level or of the reaction material gushing out of the reaction tubes can thus be prevented. The thermometers inserted in the exhaust pipes 13 measure reaction temperatures of the portions of reaction tubes near the particular thermometers. This enables control of the temperature by varying the quantity of a heating or cooling medium to be introduced into the outside jacket to maintain the reaction temperature in the reaction tubes at a proper level. However, so long as the quantities of reaction material and reagent fed continuously to the system are set beforehand and sustained at the set level throughout the operation, it is possible to continue the reaction without any trouble, because the temperature and quantity of the medium to be used can also be set beforehand.

It will be appreciated from the foregoing description that according to the present invention, the reaction material does not flow freely through the reaction tubes but is propelled forwardly along the inner wall surfaces of the reaction tubes by the rotating spiral wire members so that a reaction may occur while the material is being moved forwardly. If an exothermic reaction occurs in a shorter time than usual, the temperature in the reaction tubes will be lowered to a proper level in a short space of time by the medium in the outside jacket 10, thereby preventing undesirable side-reactions. When the reaction material to be treated is large in quantity and a reaction material and a reagent must be fed in large quantities to the system, the reaction material 17 (FIG. 3) does not flow of its own accord. It will be scraped up by the rotating spiral wire member to form a thin film spread on the inner wall surface of the reaction tubes and propelled forwardly by said spiral wire member while undergoing reaction in an optimum condition provided the reaction material lying stagnant on the bottom of tube is no longer in depth than the diameter of wire or wires forming a spiral. If a reaction occurs in this condition, the quantity of reaction material treated per unit hour can substantially be increased.

One feature characteristic of the invention is that it can adapt itself to a wide range of conditions of reaction. If a reaction takes a long period of time to occur, longer reaction tubes are used and the number of rotation of spiral wire member is reduced. If the time required for a reaction to occur is short, shorter reaction tubes are used and the number of spiral wire members is increased. Another feature is that since the operation can be carried out continuously, the capacity of the reactor system to treat a reaction material is very great relative to the physical space occupied by the equipment. In the present reactor, small quantities of reaction material and reagent will react with each other at a time while they are in the form of a thin film or a thin layer of reaction material. The materials may be cooled or heated at all times although they are fed to the reactor system continuously, enabling rapid heat exchange in a short space of time. It is another feature of the invention that the reaction time is minimized if the present reactor is used, since it enables a reaction to occur without causing any trouble at temperatures exceeding the limits set as reaction temperatures at which side-reactions might otherwise occur. Moreover, the present reactor lends itself to a use for inducing a reaction not only between liquids but also between liquid and powdered and/or granulated material.

In the present reactor, the spiral wire members move in sliding motion along the inner wall surfaces of the reaction tubes maintaining contact therewith, but there is almost no wear between the spiral wire members and the inner wall surface, for the reaction material serves as a lubricant. Since the reactor is in the form of a tubular type, a suitable lining, such as a glass lining or a rubber lining, which varies depending on the nature of reaction material, can readily be mounted on the inner wall surfaces of the tubes. The spiral wire member may be either triangular or square in section depending on the viscosity and other nature of the medicinal agents to be treated, so that the propelling efficiency of the spiral wire member can be increased and a reaction can take place under optimum conditions. Thus, it will be seen that the conditions under which a reaction takes place can be improved by varying, depending on the nature of reaction material, the form of the spiral wire members.

One example of reaction that has been caused to occur in the present reactor will now be explained. The reactor is used to bring about a reaction between an ester of malonic acid and nitrogen sesquioxide. Liquid nitrogen sesquioxide is fed through inlet port 14 at the flow rate of 36 kg. per hour, and an ester of malonic acid is fed through inlet port 15 at the flow rate of 23.4 kg. per hour. In this example, the quantity of reaction solution is such that part of the liquid remains stagnant on the bottom of the tube, but the stagnant liquid is scraped up in toto by the rotating spiral wire member as described hereinabove to be spread in a thin layer on the surface of inner wall of the tube in the direction of rotation of the spiral wire member. The reaction solution in this state is propelled forwardly while undergoing reaction. A warm water heated to temperatures ranging from 75° to 80° C. is passed to outside jacket 10 so that a reaction may take place quickly. Gases generated in the tube are vented through exhaust pipes 13 to a collecting apparatus (not shown), so that no rise in pressure occurs due to gases generated in the reaction tube, in spite of the fact that the reaction takes place quickly.

For comparison, if the same reaction is caused to take place in a conventional reactor of the batch type, the following would take place. An ester of malonic acid and nitrogen sesquioxide are fed to the reaction in small quantities so that they may react with each other. While the reaction is in progress, gases generated are drawn by suction, and ice and salt must be fed to the outer bath to cool off the reaction solution in the reactor when the temperature inside the reactor reaches 30° C. (if the temperature in the reactor exceeds 30° C. gases generated will apply inner pressure to the reaction solution which might overflow the reactor). This feeding of ice and salt is necessary in order that the reaction may proceed slowly without being left to run its course at a quick pace.

It is worth noting here that the yield achieved by the present reactor is 65%, while the yield achieved by the conventional reactor is 51%. This alone will show that the present reactor compares favorably with conventional reactors. It appears that this increase in yield is explained by the fact that when the present reactor is used, the total quantity of reaction solution consummates a reaction nearly perfectly because the chemical equivalents of an ester of malonic acid and nitrogen sesquioxide react with each other continuously in small quantities.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A reaction vessel comprising an elongated tube having reagent and reaction material inlet means at one end, an outlet means adjacent the opposite end, a plurality of jackets defined around said tube at spaced locations along the length thereof for directing a temperature control medium in heat exchange realtionship with said reaction tube, exhaust conduit means connected into said reaction tube at spaced locations along the length thereof for exhausting the tube to control the pressure of the reaction within the tube, a coiled wire member in spiral form disposed in said tube substantially in touching engagement with the interior wall thereof, said wire having coils progressing along said tube from said inlet means to said outlet means, and means for rotating said wire to move the reaction material along the walls of said reactor while the reaction is being carried out.

2. A reactor according to claim 1, including at least two separate reactor tubes, said outlet means including a tube connecting an end of said first tubular member to an end of said second tubular member, said second tubular member having a discharge opening adjacent its opposite end, and a second coiled wire positioned in said second tube and having a spiral formation progressing from said outlet means to said discharge opening for advancing reaction material delivered from said first tube to the discharge opening.

3. A reactor according to claim 2, wherein said reactor tubes are arranged in spaced parallel relationship and wherein said means for rotating said coiled wire includes spaced pulley members having shafts connected directly to a respective one of said first and second wires, and means for rotating said pulley members.

4. A reaction vessel as defined in claim 1, including at least a pair of coiled wire members spiraling in parallel relationship, the wire members of said pair as they spiral being closer to each other than to the adjacent convolutions of said spiraling wire members.

5. A reaction vessel comprising at least one elongated tube having reagent and reaction material, inlet means at one end, outlet means adjacent the opposite end, a plurality of jackets surrounding said tube at spaced locations along the length of said tube for directing a temperature control medium in heat exchange relationship with said reaction tube, exhaust conduit means connected into said reaction tube at spaced locations along the length thereof for exhausting the reaction gases from said tube to control the pressure of the reaction within the tube, at least one continuous coiled wire member in spiral form disposed in said tube substantially in touching engagement with the interior wall of said tube, the leading edge of said wire and the adjacent interior tube wall forming a material carrying pocket, the coils of said wire member progressing from said inlet means to said outlet means and means for rotating said wire member to carry reaction and reagent material deposited in a thin film on the interior wall of said reactor in said pocket along the interior wall of said tube under the impetus of the leading edge of the wire while reaction occurs.

References Cited
UNITED STATES PATENTS

| | | | |
|---|---|---|---|
| 3,336,009 | 8/1967 | Spinello | 259—8 |
| 2,530,409 | 11/1950 | Stober et al. | 23—260 XR |
| 2,235,644 | 3/1941 | Richardson | 23—277 XR |
| 1,284,488 | 11/1918 | Steward | 23—288.3 XR |
| 685,217 | 10/1901 | Miller et al. | 259—99 |

JAMES H. TAYMAN, JR., *Primary Examiner.*

U.S. Cl. X.R.

23—1, 252; 259—8; 260—465.8, 468, 475, 485, 537, 644